United States Patent

Sheda

[15] 3,642,138
[45] Feb. 15, 1972

[54] FILTERING TANKS FOR WASTE DISPOSAL SYSTEMS

[72] Inventor: Raymond F. Sheda, 317 Alder Street, Black River Falls, Wis. 54615

[22] Filed: Aug. 12, 1970

[21] Appl. No.: 63,048

[52] U.S. Cl.............................210/170, 210/259, 210/532
[51] Int. Cl......................................................B01d 23/10
[58] Field of Search................210/284, 335, 541, 243, 251, 210/170, 282, 252, 259, 532, 532 S; 61/11, 13

[56] References Cited

UNITED STATES PATENTS

| | | | |
|---|---|---|---|
| 1,454,723 | 5/1923 | Burtis | 210/259 |
| 3,426,903 | 2/1969 | Olecko | 210/532 X |
| 748,095 | 12/1903 | Pfautz | 210/284 X |
| 3,451,553 | 6/1969 | Davis | 210/170 |
| 423,767 | 3/1890 | Hough | 210/282 X |
| 534,498 | 2/1895 | Descamps | 210/335 X |
| 3,029,950 | 4/1962 | Frasca | 210/282 X |

*Primary Examiner*—Samih N. Zaharna
*Assistant Examiner*—Frederick F. Calvetti
*Attorney*—Joseph G. Werner, Theodore J. Long, John M. Winter and James A. Kemmeter

[57] ABSTRACT

A filtering tank for waste disposal systems with extension units positioned over it in telescoping relation extending to ground level and having a cover for access to the tank. The filtering tank has removable filter cages filled with particulate filtering material positioned in the fluid flow passage in the filtering tank between the inlet and outlet. Removable insulation extends across the top of the filtering tank in spaced relation above the filtering material.

2 Claims, 5 Drawing Figures

INVENTOR:
RAYMOND F. SHEDA

ATTORNEY 3,642,138

FILTERING TANKS FOR WASTE DISPOSAL SYSTEMS

FIELD OF THE INVENTION

This invention relates generally to septic systems and other waste disposal systems. To illustrate, in the past septic tanks have typically been buried below the surface of the ground with no access thereto except by digging down to the tank. Because of the inaccessibility of the tank, its condition and functioning could not be readily examined and cleaning out of the tank was often overlooked whereby suspended solids, rather than settling out in the tank, simply passed through the tank into the dry well or other component of the disposal system.

SUMMARY OF THE INVENTION

My invention is basically a filtering system construction which provides easy access to removable filters in the filtering tank. The filters, of course, separate the suspended solids rather than merely relying on a settling process. The filtering material may be periodically replaced as required.

The filtering tank of the system has one or more extension units extending to the ground surface, the top unit having a cover providing easy access to the filtering tank for replacement of the filters. The extension unit or units and the filtering tank fit together in telescoping relation so that the filtering tank can be set at any required depth.

My invention makes it considerably easier to maintain a properly functioning waste disposal system and thereby eliminate the pollution problems which arise from improperly functioning systems.

Other objects, features and advantages will be apparent from the following detailed description taken in conjunction with the accompanying drawings showing several preferred embodiments for exemplification.

DESCRIPTION OF EXEMPLARY EMBODIMENTS

Figure 1:
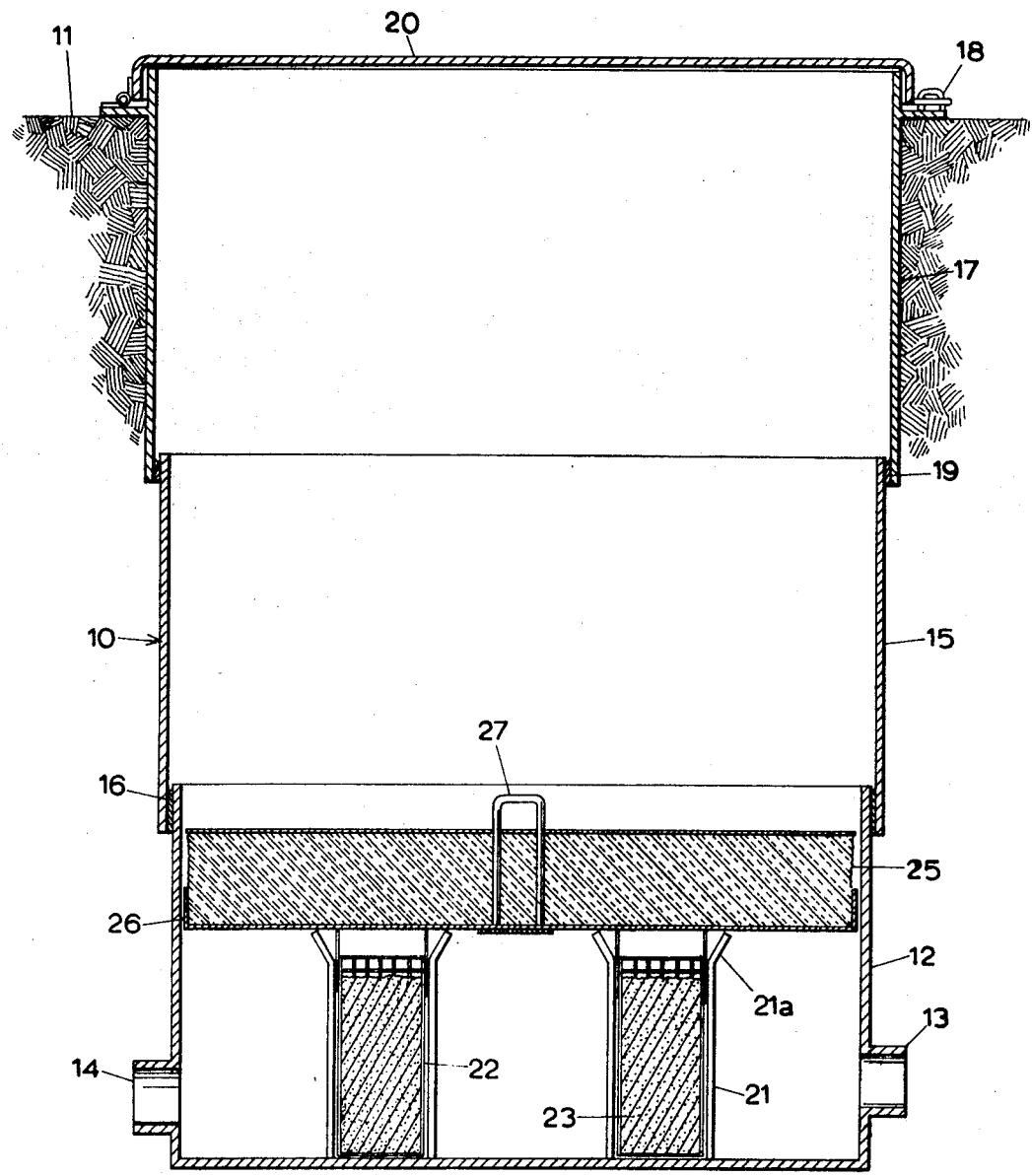
FIG. 1 is a sectional elevation view of a filtering tank construction embodying my invention.

Referring now more particularly to the drawings wherein like numerals refer to like parts throughout the several views, my new filtering tank construction is generally shown at 10 in FIG. 1 in position relative to the ground surface 11.

Figure 2:
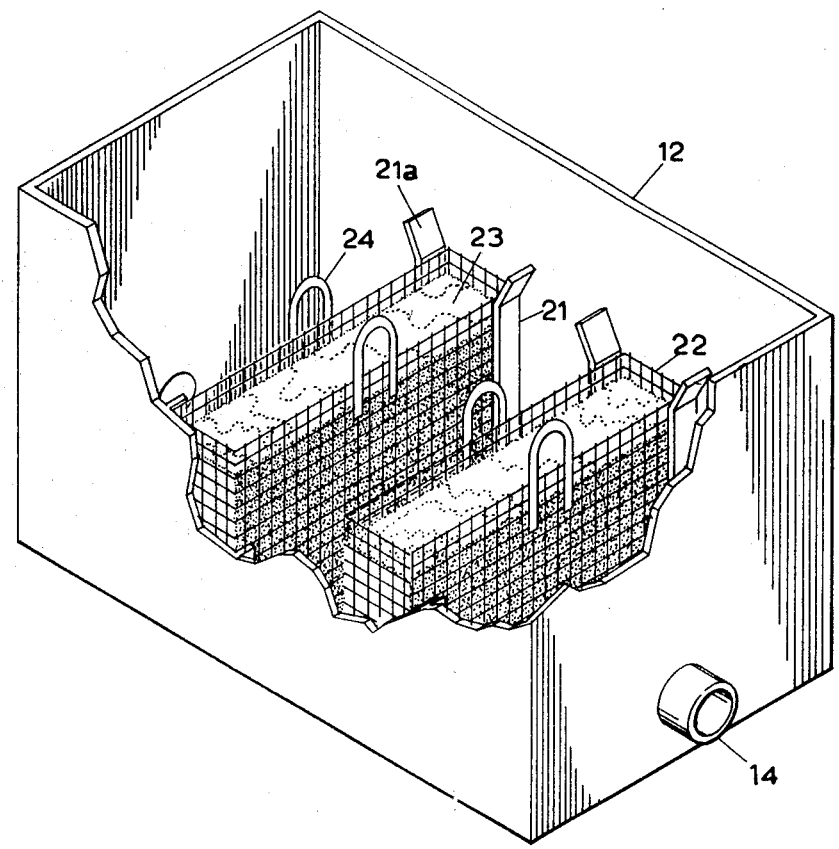
FIG. 2 is an isometric view of the filtering tank and filtering system of the tank shown in FIG. 1.
Figure 3:
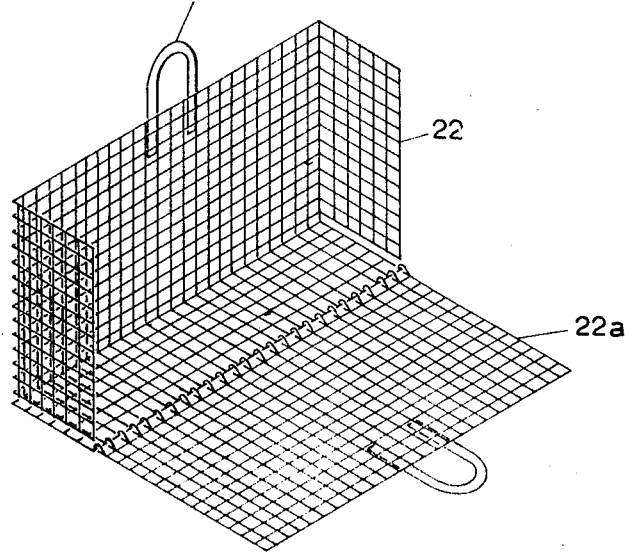
FIG. 3 is an isometric view of a filtering cage shown in FIGS. 1 and 2.

As shown in FIGS. 1–3, the filtering tank construction comprises a rectangular tank 12 providing a fluid flow passage between an inlet 13 and an outlet 14. In the arrangement shown in FIG. 1, a rectangular extension sleeve 15 is placed over the filtering tank in telescoping relation and peripherally sealed thereto with any well-known sealing materials shown at 16 such as oakum and tar, or the like. A top extension unit 17 is placed over the extension sleeve with that amount of overlap resulting when its outwardly extending peripheral flange 18 is resting on the ground surface, or just slightly below the ground surface if desired. The top unit is peripherally sealed at 19 to the middle sleeve with known sealing material.

This overlapping or telescoping relation of the units allows the filtering tank to be set at any desired depth. More extension sleeves could be added, or for shallow emplacement, the middle sleeve can be eliminated and the top unit placed directly over and sealed to the filtering tank.

The top unit has a hinged cover 20 for gaining access to the filtering tank.

The sidewalls of the filtering tank have retainer flanges 21 attached thereto for receiving filter cages 22. The filter cages may be in the form of open-topped wire mesh baskets with a hinged wall 22a as shown. The cages are filled with particulate filter material 23 such as chopped spagnum moss which I believe is the best natural filtering material. The filled cages are then lowered with a hook (not shown) engaged in handles 24 into position between the retainer flanges. The top portions 21a of the retainer flanges are flared outwardly to assist in dropping the filter cages into position.

As shown in FIGS. 1 and 2, the filters are positioned in the fluid flow passage between the inlet and outlet and are spaced from the inlet and outlet to provide inflow and outflow chambers so as not to obstruct the flow from the inlet or into the outlet.

To protect the system from freezing up during cold weather, a layer of insulating material 25 in a carrier basket 26 rests on the top edge of the retainer flanges as shown in FIG. 1. The insulation material is maintained in spaced relation from the filtering material so as to provide an air passage over the filtering material. The basket 26 has a handle 27 for lowering it into position and for removing it when desired.

When the filters become clogged with waste material, the insulator basket is first raised with a hook (not shown). The filter cages are then also removed with the hook. The particulate spagnum moss filter material can be easily removed from the filter cages by opening the hinged wall thereof as shown in FIG. 3 and dumping the material.

It should also be understood that, while two filters are shown for exemplification, one or more filters may be employed as needed. Further, the filters may be of the replacement cartridge type wherein the particulate filter material is permanently encased in enclosed cages. When new filtering material is needed, the filter cartridges are merely removed, discarded and replaced with new ones.

Figure 4:
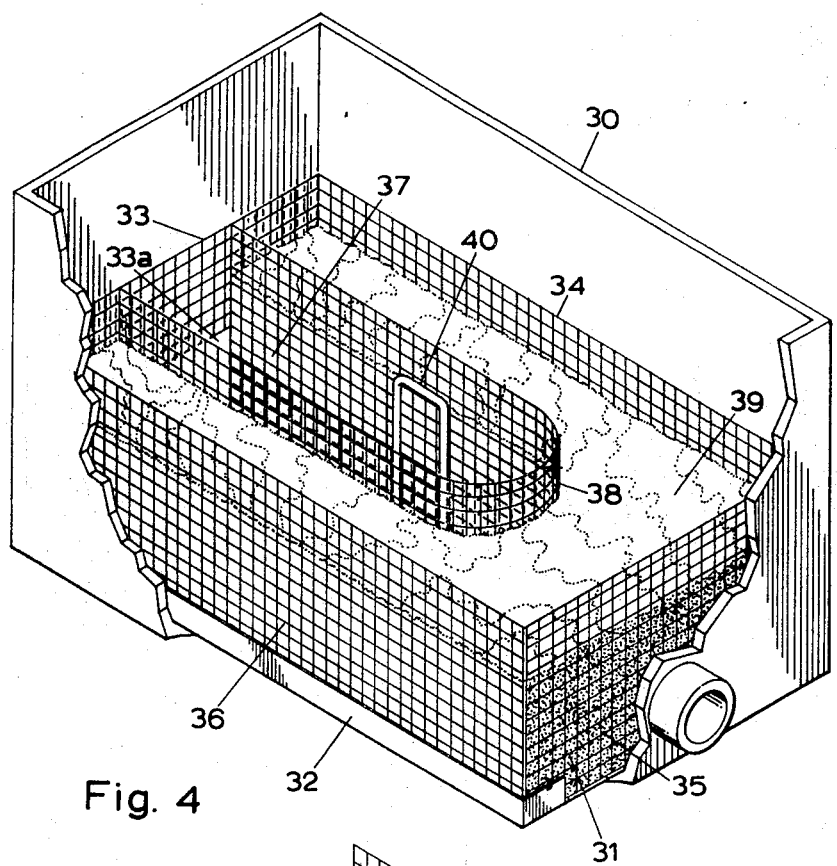
FIG. 4 is an isometric view of a second form of filtering tank and filtering system embodying my invention.
Figure 5:
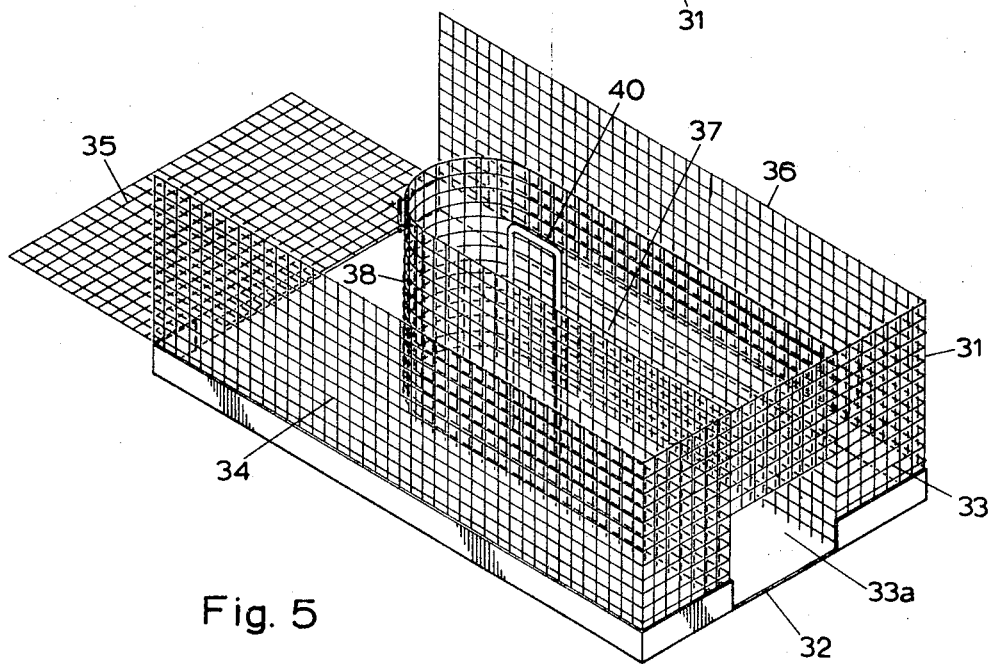
FIG. 5 is an isometric view of the filter cage shown in FIG. 4.

A second form of filtering tank 30 and filtering system are shown in FIGS. 4 and 5. The filtering tank 30 has a filter cage 31 with a solid bottom 32 and four generally rectangular sidewalls 33, 34, 35, and 36. Sidewall 33 has an opening 33a formed therein communicating with a inflow chamber 37 formed in the filter cage by a generally U-shaped interior wall 38.

Particulate filtering material 39 is placed in the filter cage around the inflow chamber as shown in FIG. 4.

The filter cage may be raised with a hook (not shown) engaged in handle 40 which extends upwardly in the inflow chamber from the bottom of the cage. The particulate filtering material may be easily dumped from the cage by opening the hinged sidewall 35 thereof as shown in FIG. 5. It is also understood that this filter may be of the cartridge type with permanently encased particulate material.

In the form of filtering tank shown in FIG. 4, the carrier basket for the insulating material would rest directly on the filter cage.

The filtering tanks and extension units shown may be made of any substantially rigid, impervious material, however fiber glass is preferred because of its noncorrosive character.

It is understood that the present invention is not confined to the particular construction and arrangement of parts or materials herein illustrated and described, but embraces all such modified forms thereof as come within the scope of the following claims.

I claim:

1. In a waste disposal system having a septic tank and a dry well, the improvement comprising:
   a. a filtering tank having an inlet and an outlet and providing a fluid flow passage between the septic tank and the dry well,
   b. at least one extension unit positioned over and encompassing said filtering tank in mating relation,
   c. an openable top cover on said extension unit,
   d. a removable filter means disposed in the fluid flow passage in said filtering tank between said inlet and said outlet, said filter being spaced from said inlet, and e. removable heat-insulating means substantially coextensive with and extending across the top of said filtering tank above said filter means.

2. In a waste disposal system having a septic tank and a dry well, the improvement comprising:
 a. a filtering tank having an inlet and an outlet and providing a fluid flow passage between the septic tank and the dry well,
 b. an extension sleeve positioned over and encompassing said filtering tank in telescoping relation,
 c. a top extension unit positioned over and encompassing said extension sleeve in telescoping relation,
 means sealing said filtering tank to said extension sleeve and said extension sleeve to said top extension unit,
 e. an openable top cover on said top extension unit,
 f. removable filter means disposed in said filtering tank in the fluid flow passage between said inlet and said outlet, said filter means being spaced from said inlet, and
 g. removable heat-insulating means substantially coextensive with and extending across the top of said filtering tank above said filter means.

* * * * *